United States Patent [19]
Jovanovich

[11] Patent Number: 5,819,464
[45] Date of Patent: Oct. 13, 1998

[54] CONDITION-ADAPTABLE COLORED FISHING NET

[76] Inventor: John Jovanovich, 15636 Des Moines Way S., Seattle, Wash. 98148

[21] Appl. No.: 13,387

[22] Filed: Jan. 26, 1998

[51] Int. Cl.[6] .................................................. A01K 71/00
[52] U.S. Cl. .................................................. 43/10
[58] Field of Search ................................ 43/7, 10, 11, 14, 43/4, 4.5, 9.95

[56] References Cited

U.S. PATENT DOCUMENTS

| | | | |
|---|---|---|---|
| 3,793,822 | 2/1974 | Kawai | 57/140 |
| 4,501,084 | 2/1985 | Mori | 43/17.5 |
| 4,710,407 | 12/1987 | Keeton | 43/7 |
| 5,442,875 | 8/1995 | Brundage et al. | 43/11 |
| 5,484,313 | 1/1996 | Rachal et al. | 441/80 |
| 5,647,160 | 7/1997 | Anderson | 43/10 |

Primary Examiner—Thomas Price
Attorney, Agent, or Firm—Dean A. Craine

[57] ABSTRACT

A condition-adaptable fishing net designed to catch more fish. The fishing net includes a single, large panel of netting having a main, light color capable of blending in water under certain water and lighting conditions. Disposed randomly over the panel of netting are a plurality of various sizes and shapes of colored areas, each having a color selected from a group of colors, all capable of blending in water under different water and lighting conditions. By randomly creating different colored areas over the net panel, what fish will believe to be holes or barrier free areas, appear randomly in the panel of netting. During use, the different colored shapes randomly appear as holes or barrier free areas in the panel of netting through which the fish then attempt to swim, thus becoming entangled in the net.

7 Claims, 1 Drawing Sheet

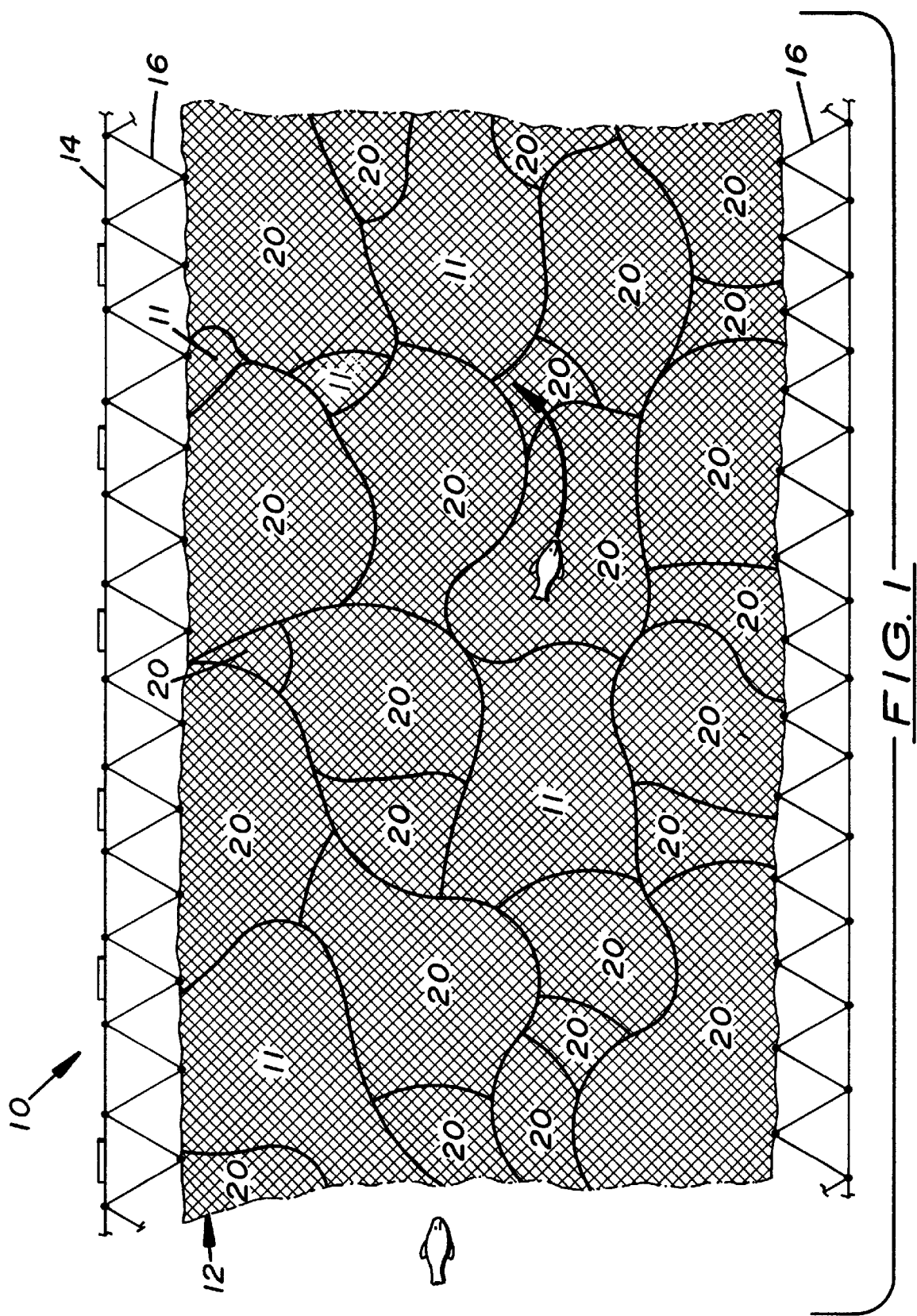

CONDITION-ADAPTABLE COLORED FISHING NET

BACKGROUND OF THE INVENTION

1. Field of the Invention

This invention relates to fishing nets and, more particularly, to colored fishing nets capable of adapting to fishing conditions to improve their fish catching ability.

2. Description of the Related Art

Colored nets are commonly used in the fishing industry. Such nets are constructed by sewing different colored net panels together or by dyeing sections of a large net different colors to create sections of net more or less visible in water. Typically, these colored net panels or sections are aligned in alternating horizontal or vertical rows.

For example, U.S. Pat. No. 5,647,160 discloses a fishing net with multiple, alternating, horizontally aligned rows of netting dyed in visible and invisible colors. The inventor postulates that when fish swim next to a section of netting dyed a visible color, they swim away from it and towards an adjacent section of netting dyed an invisible color and becoming entrapped. One drawback of this theory is it mistakenly assumes that fish swim in a direction perpendicular to the longitudinal axis of the dyed sections. While more fish may be entrapped in the invisible color section of netting, such nets are still relatively inefficient because most fish, when seeing the visible section, swim away in a random direction thus avoiding the net altogether.

Years of experience with colored nets have shown that many fish can detect a colored net and will swim along the inside surface looking for an edge or hole to swim through. If an area of net appears to be a hole or edge, the fish will quickly attempt to swim through it and become entangled.

It is also known that the turbidity of the water, the light conditions, and the depth of the water are important factors which affect the fish's visibility of the net. Since each of these factors can change suddenly, the efficiently of single color or multiple row colored net can change.

What is needed is a fishing net which is more efficient than typical colored nets and which is adaptable to all fishing conditions.

SUMMARY OF THE INVENTION

It is an object of the invention to provide a more efficient colored fishing net.

It is another object of the invention to provide a fishing net with randomly disposed, multiple shaped and multiple colored areas designed to create what appear to fish to be holes or barrier-free areas and thus improving the net's fish capturing ability.

It is a further object of this invention to provide such a fishing net that is better suited for the random swimming patterns of fish.

It is a further object of the invention to provide such a fishing net adaptable to different fishing conditions.

These and other objects are met by providing a fishing net that is more efficient than typical colored fishing nets at catching fish. The fishing net hereinafter called a mottled fishing net, includes a single, large net panel being a color capable of blending in water under typical water and lighting conditions. Created randomly on the net panel are a plurality of different size and shape colored areas, each being a color selected from a group of different colors, all capable of blending in water under certain water and lighting conditions. By randomly creating different colored areas on the net panel, what fish will believe to be holes or barrier-free areas are created across the entire net panel under all fishing conditions, so that the overall efficiency of the net is substantially improved over typical colored nets.

BRIEF DESCRIPTION OF THE DRAWINGS

FIG. 1 is a front elevational view of the invention.

DESCRIPTION OF THE PREFERRED EMBODIMENT(S)

Shown in the accompanying FIGURE, there is shown a mottled fishing net, generally referred to as 10, comprising a net panel 12 capable of being used for fishing, the net panel 12 having a main color 11 capable of blending in water. The top edge of the net panel 12 is attached to a float line 14 with spaced-apart stringers 16. The bottom edge of the net panel 12 is attached to a lead line 18 with spaced-apart stringers 16 which extend and stabilize the net 10 in a substantially vertical orientation in water.

The net panel 12 can vary between 50 to 1,800 feet in length and vary between 5 to 125 feet in width when deployed. The size of the mesh openings in the net panel 12 are established by local fishing regulations.

Randomly disposed across the entire length and width of the net panel 12 are a plurality of different colored areas 20. The areas 20 have various shapes and sizes. The areas 20 have a color randomly selected from a group of colors all capable of blending in water and opening as a hole 20 to fish under different water and lighting conditions. Neither the net panel 12 not the areas 20 have a color intended to be visible in water.

In the preferred embodiment, the net panel 12 is made of nylon or other synthetic fish netting. Typically, the net panel 12 is off-white in color. In the preferred embodiment, the areas 20 are between 2 to 20 feet in width and 20 to 150 feet in length and dyed various colors selected from a group of colors listed in Table 1. The colors listed in Table 1 have been shown to blend and be invisible in water during varying fishing conditions. It should be understood that the color of the areas could be blends of the colors listed in Table I.

By randomly disposing the color areas 20 over the entire net panel 12, the fish entangling properties of the net panel 12 are substantially improved since fish typically swim in random directions along side the fishing net. By randomly assigning different colors to the areas 20, the visibility of the areas 20 of the net panel 12 changes according to the fishing conditions thereby improving the fish entrapping efficiency of the net 10.

In compliance with the statute, the invention, described herein, has been described in language more or less specific as to structural features. It should be understood, however, the invention is not limited to the specific features shown, since the means and construction shown comprised only the preferred embodiments for putting the invention into effect. The invention is, therefore, claimed in any of its forms or modifications within the legitimate and valid scope of the amended claims, appropriately interpreted in accordance with the doctrine of equivalents.

TABLE I

| green | light blue | brown | light green |
|-------|------------|-------|-------------|
| aqua  | tan        | blue  | gray        |

I claim:

1. A condition-adaptable fishing net, comprising
   a. A net panel capable of being used for fishing, said net panel having a main color capable of blending in water; and,
   b. A plurality of randomly disposed, different colored areas with respect to said main color created on said net panel, said colored areas having a color selected from a group of colors all capable of blending in water under different water and lighting conditions.

2. A fishing net, as described in claim 1, wherein the group of colors include green, light green, blue, light blue, aqua, gray, brown and grey.

3. A fishing net, as described in claim 1, further including a float line attached to said net panel.

4. A fishing net, as recited in claim 3, further including a lead line attached to said net panel.

5. A fishing net, as recited in claim 1, wherein said net panel is made of nylon.

6. A fishing net, as recited in claim 1, wherein said areas are between 2 to 20 feet in width and 20 to 150 feet in length.

7. A fishing net, as recited in claim 6, wherein said areas are dyed on said net panel.

* * * * *